(12) United States Patent
Okuda et al.

(10) Patent No.: US 7,002,881 B2
(45) Date of Patent: Feb. 21, 2006

(54) LIGHT RECEIVING AMPLIFICATION ELEMENT

(75) Inventors: Takanori Okuda, Nara (JP); Masaya Ohnishi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 406 days.

(21) Appl. No.: 10/461,596

(22) Filed: Jun. 12, 2003

(65) Prior Publication Data
US 2003/0231574 A1    Dec. 18, 2003

(30) Foreign Application Priority Data
Jun. 14, 2002  (JP) .............................. 2002-174370

(51) Int. Cl.
*G11B 7/00* (2006.01)

(52) U.S. Cl. .............................. 369/44.41; 369/44.37; 369/44.29; 369/44.35; 369/124.01

(58) Field of Classification Search ..................... None
See application file for complete search history.

(56) References Cited

U.S. PATENT DOCUMENTS 6,243,336 B1 *  6/2001  Schell et al. ............. 369/44.29
6,910,174 B1 *  6/2005  Keeler ........................ 714/769

FOREIGN PATENT DOCUMENTS

| JP | 2001-202646 | 7/2001 |
| JP | 2001-307362 | 11/2001 |

* cited by examiner

*Primary Examiner*—Muhammad Edun
(74) *Attorney, Agent, or Firm*—Morrison & Foerster LLP

(57) ABSTRACT

The object of the invention is to provide a light receiving amplification element applicable to an optical pickup apparatus comprising a semiconductor two-wavelength laser element and one condensing lens. The light receiving amplification element is provided with a plurality of light receiving portions corresponding to different wavelengths, a plurality of trans-impedance type amplifiers connected to the light receiving portions according to the different wavelengths and adaptable to the different wavelengths and switching portion for switching output from the trans-impedance type amplifier according to each of the wavelengths.

15 Claims, 5 Drawing Sheets

LIGHT RECEIVING AMPLIFICATION ELEMENT

BACKGROUND OF THE INVENTION

1. Field of the Invention

The present invention relates to a light receiving amplification element to be used for an optical pickup apparatus using a semiconductor two-wavelength laser element which outputs light with two different wavelengths from one chip.

2. Description of the Related Art

Optical disks such as CD, DVD and the like are widely utilized as media on which a voice, an image, document data or the like is recorded and development is performed for various types of optical disk apparatuses which performs reproducing or recording the optical disk. An optical pickup apparatus is a main component for performing an input/output of a signal to/from the optical disk in a head portion of the optical disk apparatus.

Since a DVD reproduction apparatus, which prevails rapidly in recent years, requires capability of reproducing an existing CD, the optical pickup apparatus requires two semiconductor laser elements having 650 nm wavelength for DVD and 780 nm wavelength for CD, respectively.

FIG. 7 is a side view showing an optical pickup apparatus for performing reproduction of DVD and CD.

Referring to FIG. 7, an optical pickup apparatus 101 is provided with two semiconductor laser elements 107 and 108 each of which acts as a light source. The semiconductor laser element 107 outputs (emits) a light having 650 nm wavelength for DVD and the semiconductor laser element 108 outputs (emits) a light having 780 nm wavelength for CD. A prism 106 and an optical lens 103 comprising a condensing lens 104 for DVD and a condensing lens 105 for CD are arranged on a light path from the semiconductor laser elements 107 and 108 to an optical disk 102.

In addition, the optical pickup apparatus 101 is provided with a light receiving amplification element 109 having a light receiving portion (a photo diode) for receiving laser light which is reflected by the optical disk 102 and is reflected by the prism 106 via the optical lens 103. The optical lens 103 is provided with a function of switching between semiconductor laser elements 107 and 108 so as to correspond to a selected wavelength and simultaneously switching between condensing lenses 104 and 105.

When DVD (wavelength: 650 nm) is selected, the optical disk 102 is irradiated with emitting light from the semiconductor laser element 107 via the condensing lens 104 and light reflected by the optical disk 102 is reflected by the prism 106 via the condensing lens 104 and is inputted in the light receiving amplification element 109 and is photoelectrically converted by the light receiving amplification element 109 and an electric signal is outputted. When CD (wavelength: 780 nm) is selected, the optical disk 102 is similarly irradiated with emitting light from the semiconductor laser element 108 via the condensing lens 105 and light reflected by the optical disk 102 is reflected by the prism 106 via the condensing lens 105 and is inputted in the light receiving amplification element 109.

Since a light path can be adjusted by the two condensing lens 104 and 105 with respect to two light sources (the semiconductor laser elements 107 and 108), the light receiving portion (the photo diode) on the light receiving amplification element 109 has a shape shown in FIG. 8 and a light receiving portion 201 comes into receiving a laser light for 650 nm wavelength for DVD as well as 780 nm wavelength for CD. Here, focus adjustment and reproduction of a data signal are performed in a main light receiving portion 202 which is arranged in the center of the light receiving portion 201 and is divided into 4 portions. In addition, tracking adjustment is performed in sub-light receiving portions 203 arranged on the right and left sides of the main light receiving portion 202.

Next, FIG. 9 shows an equivalent circuit block diagram of the light receiving amplification element according to the prior art.

In FIG. 9, the whole of the block diagram is denoted as a light receiving amplification element 301, and a light receiving portion 302 (the photo diode) corresponds to each of A through D of the main light receiving portion 202 and E through H of the sub-light receiving portion 203. A laser light signal is converted to an electric signal Isc in the light receiving portion 302 and the signal Isc is amplified by current-voltage conversion by a resistance R11 of a pre-amplifier 11 and voltage of the signal is more amplified by a post-amplifier A12, resistances R12, R13 and R14 and the signal is outputted to an output terminal 303.

In the optical pickup apparatus in FIG. 7 described in the prior art, two semiconductor laser elements 107 and 108 and two condensing lenses 104 and 105 respectively corresponding to two different wavelengths (650 nm, 780 nm) are required and it is required that reflecting (signal) light is guided from the optical disk to the light receiving amplification element by adjusting an optical system such as a position of the semiconductor laser element, a position of the condensing lens or the like for each of the two wavelengths. Consequently, since optical design including the semiconductor laser element is complicated and there is necessity of a mechanism available for switching the optical system between the two wavelengths, the optical design becomes more complicated and the number of parts is increased and there is progress related cost is also increased.

Consequently, as a semiconductor laser element, there has been advanced development and commercialization of a semiconductor two-wavelength laser element which outputs (emits) light with two different wavelengths from one chip and there has been adopted a single semiconductor two-wavelength laser element for the optical pickup apparatus instead of using two semiconductor laser elements.

Advantage of the semiconductor two-wavelength laser element is capability for making a distance between two-wavelength light emitting points closed in order of $\mu$m and with extremely high accuracy of positions of the two-wavelengths light emitting points because the two wavelengths light emitting points are formed on a same substrate by using a technique of semiconductor photograph. Therefore, even when the optical disk is irradiated with laser light via one condensing lens and reflecting (signal) light from the optical disk is guided to the light receiving amplification element, a distance between receiving light points for two wavelengths is fixed with high accuracy.

As mentioned above, on the assumption that the number of the semiconductor laser elements and the number of the condensing lenses are defined as one respectively, there is necessity for the light receiving portion (i.e. the photo diode) corresponding to two wavelengths on the light receiving amplification element. In addition, there is necessity for a circuit amplifying an electric signal which is photoelectrically converted from the light receiving portion corresponding to each of the two wavelengths.

SUMMARY OF THE INVENTION

Consequently, the object of the invention is to solve the above-mentioned problems and provide a light receiving amplification element which is appropriate to an optical pickup apparatus provided with semiconductor two-wavelength laser element and a single condensing lens (optical element).

The invention provides a light receiving amplification element which is used for an optical pickup apparatus including a semiconductor laser having a plurality of light emitting points from which different wavelength light is emitted each other, and an optical element for irradiating an optical disk with emitting light from the semiconductor laser and guiding reflecting light on the optical disk to the light receiving amplification element, the light receiving amplification element comprising:

a plurality of light receiving portions corresponding to the different wavelengths;

a plurality of trans-impedance type amplifiers connected to the light receiving portions according to the different wavelengths and corresponding to the different wavelengths; and switching means for switching outputs from the trans-impedance type amplifiers according to each of the wavelengths.

In the invention, it is preferable that the plurality of trans-impedance type amplifiers comprise a first trans-impedance type amplifier having a feedback constant adapted to a first wavelength and a second trans-impedance type amplifier having a feedback constant adapted to a second wavelength.

The invention provides a light receiving amplification element which is used for an optical pickup apparatus including a semiconductor laser having a plurality of light emitting points from which different wavelength light is emitted each other and an optical element for irradiating an optical disk with emitting light from the semiconductor laser and guiding reflecting light on the optical disk to the light receiving amplification element, the light receiving amplification element comprising:

a plurality of light receiving portions corresponding to the different wavelengths;

a plurality of trans-impedance type amplifiers connected to the plurality of light receiving portions and corresponding to a plurality of optical disks with different reflectance; and switching means for switching outputs from the trans-impedance type amplifiers according to the optical disk, the light receiving amplification element being commonly connected between outputs from the plurality of light receiving portions and inputs to the plurality of trans-impedance type amplifier.

In the invention, it is preferable that the plurality of trans-impedance type amplifiers comprise a first trans-impedance type amplifier having a first feedback constant adapted to reflectance of a reproduction only optical disk and a second trans-impedance type amplifier having a second feedback constant adapted to reflectance of a rewritable optical disk.

In the invention, it is preferable that a clamp circuit comprising a diode and a resistance is connected in parallel to a second feedback circuit which sets the second feedback constant.

In the invention, it is preferable that the first and second trans-impedance type amplifiers comprise:

first and second differential elements;

a single current mirror circuit in which output of the differential elements is electrically connected to each other and which acts as an active load;

an emitter follower output circuit; and two feedback circuits, an output terminal is provided with respect to the first and second trans-impedance type amplifiers.

In the invention, it is preferable that the switching means operates to bias emitter connecting points of the first and second differential elements in first and second current sources comprising a constant current source, a switching circuit and a current mirror circuit; to switch the first and second current sources by an external switching signal; and to switch the first and second differential elements in an active state.

In the invention, it is preferable that the plurality of light receiving portions and the plurality of trans-impedance type amplifiers are formed on a single chip and a distance between the plurality of light receiving portions is equal to a distance between the plurality of emitting points.

The invention provides an optical pickup apparatus using the above-mentioned light receiving amplification element.

According to more detailed description, the invention provides an optical pickup apparatus comprising:

a semiconductor laser having a plurality of light emitting points from which different wavelength light is emitted each other;

a light receiving amplification element including:
 a plurality of light receiving portions corresponding to the different wavelengths;
 a plurality of trans-impedance type amplifiers connected to the light receiving portions according to the different wavelengths and corresponding to the different wavelengths; and
 switching means for switching an output from the trans-impedance type amplifier according to each of the wavelengths; and an optical element for irradiating an optical disk with emitting light from the semiconductor laser and guiding reflecting light on the optical disk to the light receiving amplification element.

The invention provides an optical pickup apparatus comprising:

a semiconductor laser having a plurality of light emitting points from which different wavelength light is emitted each other;

a light receiving amplification element including:
 a plurality of light receiving portions corresponding to the different wavelengths;
 a plurality of trans-impedance type amplifiers connected to the plurality of light receiving portions and corresponding to a plurality of optical disks with different reflectance; and
 switching means for switching an output from the trans-impedance type amplifier according to the optical disk,
 the light receiving amplification element being commonly connected between outputs from the plurality of light receiving portions and inputs to the plurality of trans-impedance type amplifier; and an optical element for irradiating an optical disk with emitting light from the semiconductor laser and guiding reflecting light on the optical disk to the light receiving amplification element.

The light receiving amplification element according to the invention is used for the optical pickup apparatus provided with the semiconductor two-wavelength laser element which outputs the laser light with two different wavelengths from one chip and a single condensing lens (optical element) for irradiating the optical disk with laser light from the semiconductor two-wavelength laser element irrespective of a wavelength and guiding the reflecting light to the light receiving amplification element.

The light receiving amplification element is provided with two light receiving portions (photo diodes) corresponding to two different wavelengths respectively and the trans-impedance type amplifier is connected to each of the two light receiving portions, and selection and switching operation is performed between the trans-impedance type amplifiers according to a wavelength to be selected. Thereby light receiving amplification output corresponding to each of two wavelengths can be obtained. In addition, since the light receiving amplification element is provided with the trans-impedance type amplifier with respect to each light receiving portion corresponding to each of wavelengths, circuit characteristics can be adjusted so as to be optimized for each wavelength.

Other light receiving amplification element is provided with two light receiving portions (photo diodes) corresponding to two different wavelengths respectively, and signal output terminals of the two light receiving portions are connected to each other and connected signals are inputted respectively in the first trans-impedance type amplifier having the first feedback constant and the second trans-impedance type amplifier having the second feedback constant which are different from each other, and the first and second feedback constants (gain resistance) are set so as to be adapted to reflectance of the reproduction only optical disk and reflectance of the rewritable optical disk. Thereby satisfactory reproduction characteristics can be obtained for the reproduction only optical disk having a high reflectance and also for the rewritable optical disk having a low reflectance in both cases of two wavelengths.

In addition, it is preferable that the first feedback constant (gain resistance) is set for reproduction and the second feedback constant is set for rewriting respectively and a clamp circuit comprising diode and resistance is connected in parallel to a second feedback circuit. Thereby, at the time of inputting large quantity of light for writing operation, amplifier gain is lowered and saturation of the light receiving portion can be prevented and therefore light receiving amplifier characteristics adaptable to reproduction and rewriting can be obtained in both cases of two different wavelengths.

In addition, it is preferable that the two trans-impedance type amplifiers (pre-amplifiers) connected to the above-mentioned two light receiving portions respectively comprise two differential elements (first and second differential elements), a single current mirror circuit in which collectors are connected to each other as output of the differential elements and which acts as an active load, an emitter follower output circuit, and two feedback circuits. Thereby the two pre-amplifiers have one output terminal and an output signal is outputted from the output terminal with voltage further amplified by one post-amplifier and therefore only one post-amplifier with only one external output terminal is required for the two light receiving portions and increase of cost of chips caused by increase of a scale of a circuit can be restrained and furthermore there is no increase of the external output terminals (i.e. pins). Consequently, increase of cost of the light receiving amplifier element including a package can be restrained.

In addition, it is preferable that bias current of each of the differential elements configuring the trans-impedance type amplifiers is switched between ON and OFF states as switching means for the two trans-impedance type amplifiers. Thereby a trans-impedance type amplifier corresponding to each wavelength performs active selection, and therefore switching function can be realized by a small number of elements and increase of cost caused by increase of a chip area can be restrained.

In addition, it is preferable that the two light receiving portions corresponding to the two wavelengths respectively are formed on the same substrate on which the amplifying circuit is formed. Thereby accuracy of positions of the two light receiving portions corresponding to each of wavelengths can be enhanced by using technique of semiconductor photograph.

Furthermore, the distance between the two receiving light portions is adapted to the distance between emitting points for each wavelength of the semiconductor two-wavelength laser element to be used and thereby satisfactory light receiving characteristics can be obtained.

The light receiving amplification element is configured so that one output is obtained by switching two light receiving portions adapted to the distance between the light emitting points of the semiconductor two-wavelength laser which outputs the laser light having two different wavelengths from one chip and the trans-impedance type amplifiers which are connected to the two light receiving portions respectively, thereby the invention can provide the light receiving amplification element adaptable to the optical pickup apparatus using the semiconductor two-wavelength laser.

In addition, in configuration of switching the two trans-impedance type amplifiers, even when the reflectance of the optical disk varies, the invention provides the light receiving amplification element adaptable to the optical pickup apparatus using the semiconductor two-wavelength laser capable of obtaining stable output by adjusting the constant of the feedback circuit.

Furthermore, in configuration of switching the two trans-impedance type amplifiers, the invention provides the light receiving amplification element adaptable to the optical pickup apparatus using the semiconductor two-wavelength laser provided with function of recording/reproducing by arranging the clamp circuit on one of the feedback circuits.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
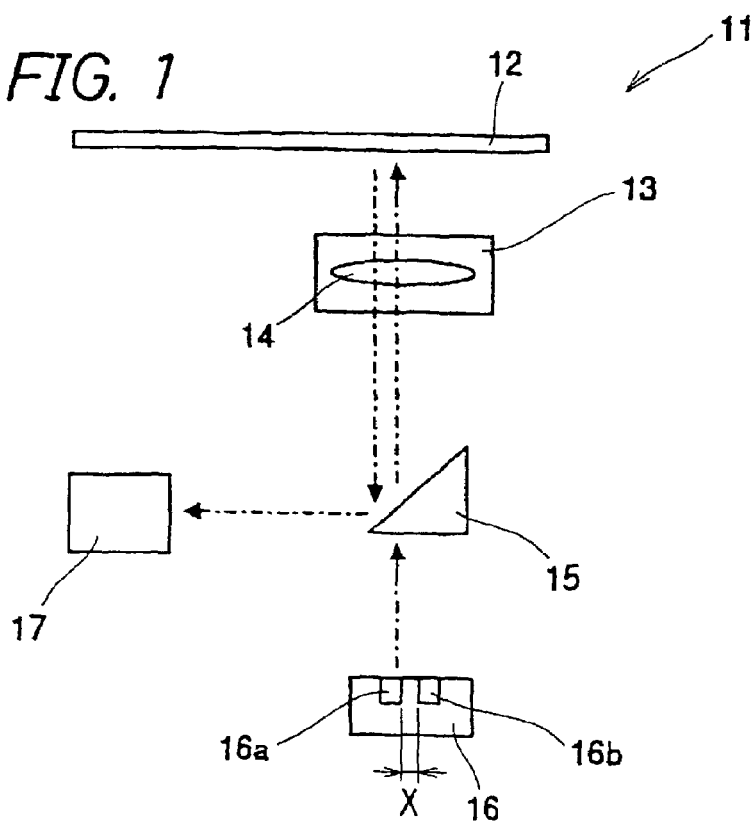
FIG. 1 is a side view of an optical pickup apparatus using a light receiving amplification element in the invention.

Now referring to the drawings, preferred embodiments of the invention are described below.

(Embodiment 1)

FIG. 1 is a side view of the optical pickup apparatus in the embodiment 1 of the invention.

Referring to FIG. 1, an optical pickup apparatus 11 is provided with a semiconductor two-wavelength laser element (hereinafter referred to as a two-wavelength laser) 16 which acts as a light source. The two-wavelength laser 16 forms two laser emitting points for different wavelengths on the same substrate. Reference numeral 16a denotes a first emitting point for DVD (650 nm wavelength) and reference numeral 16b denotes a second emitting point for CD (780 nm wavelength). An optical lens 13 comprising a prism 15 and a condensing lens 14 is arranged on a light path from the two-wavelength laser 16 to an optical disk 12. Furthermore, the optical pickup apparatus 11 is provided with a light receiving amplification element 17 having a light receiving portion for receiving laser light which is reflected by the optical disk 12 and is reflected by the prism 15 via the optical lens 13. A photo diode is used for the light receiving portion.

Figure 2:
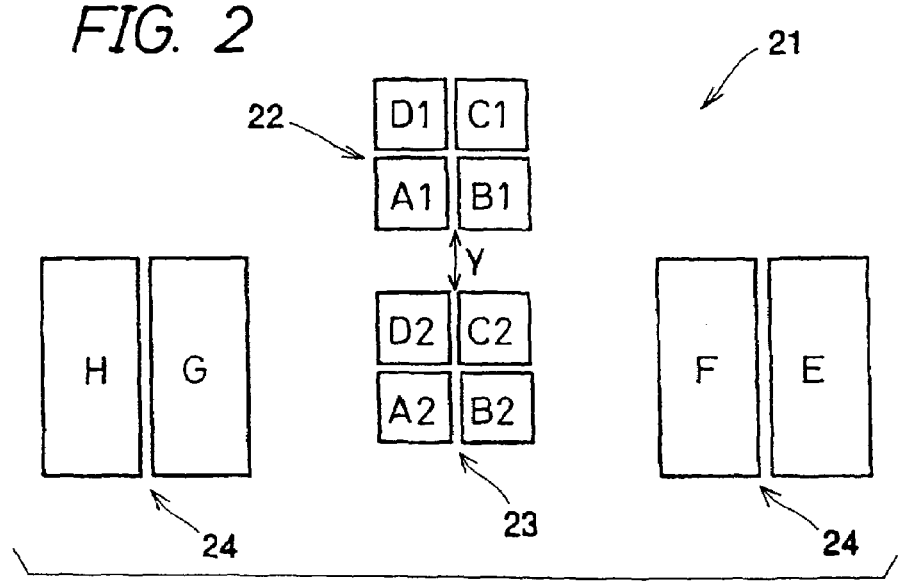
FIG. 2 is a view showing a shape of a light receiving portion of the light receiving amplification element in the invention.

As mentioned above, since the optical disk 12 is irradiated with light having two different wavelengths outputted (emitted) from the two-wavelength laser 16 via one fixed condensing lens 14 and light reflected by the condensing lens 14 is inputted in the light receiving amplification element 17, the light receiving portion of the light receiving amplification element 17 is shaped as shown in FIG. 2.

Referring to FIG. 2, a light receiving portion 21 of the light receiving amplification element comprises a main light receiving portion 22 for DVD (650 nm wavelength) and a main light receiving portion 23 for CD (780 nm wavelength) and a sub light receiving portion 24. The optical system is designed so that 650 nm wavelength light for DVD can be incident on the light receiving portion 22 and 780 nm wavelength light for CD can be incident on the light receiving portion 23, which wavelength lights are outputted from the two-wavelength laser 16 and reflected by the optical disk and inputted.

Figure 3:
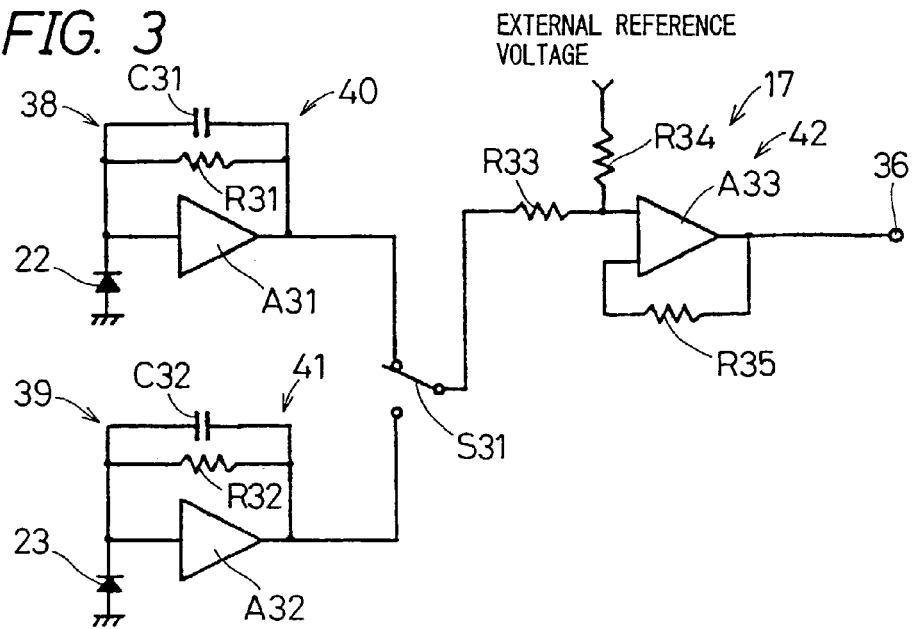
FIG. 3 is an equivalent circuit block diagram of the light receiving amplification element according to an embodiment 1 of the invention.

FIG. 3 is an equivalent circuit block diagram of the light receiving amplification element which outputs light signal from the two main light receiving portions corresponding to two wavelengths in FIG. 2 as electric signal.

As to the light receiving amplification element 17, first and second trans-impedance type amplifiers (pre-amplifiers) 40 and 41 respectively comprising a first amplifier A31, a first feedback resistance R31, a first capacity C31 and a second amplifier A32, a second feedback resistance R32, a second capacity C32 are connected to the two main light receiving portions 22 and 23. Output voltage of the two trans-impedance type amplifiers 40 and 41 is amplified by a post-amplifier 43 comprising a third amplifier A33 and a third resistance R33 through a fifth resistance R35 via an output switching switch S31 and the signal is outputted from an external output terminal 36.

According to more detailed description, the first trans-impedance type amplifier 40 includes the first amplifier A31, the first feedback resistance R31 and the first capacity C31. Output of the light receiving portion 22 is electrically connected to an input terminal of the first amplifier A31. The first feedback resistance R31 and the first capacity C31 are electrically connected in parallel between an input terminal and an output terminal of the first amplifier A31. Thus, the first feedback resistance R31 and the first capacity C31 configure a first feedback circuit 38 for performing feedback of output of the first amplifier A31 to the input side. The output terminal of the first amplifier A31 is electrically connected to one input terminal of the output switching switch S31.

The second trans-impedance type amplifier 41 includes the second amplifier A32, the second feedback resistance R32 and the second capacity C32. Output of the light receiving portion 23 is electrically connected to an input terminal of the second amplifier A32. The second feedback resistance R32 and the second capacity C32 are electrically connected in parallel between an input terminal and an output terminal of the second amplifier A32. Thus, the second feedback resistance R32 and the second capacity C32 configure a second feedback circuit 39 for performing feedback of output of the second amplifier A32 to the input side. The output terminal of the second amplifier A32 is electrically connected to the other input terminal of the output switching switch S31.

A post-amplifier 42 includes the third amplifier A33 and the third resistance R33 through the fifth resistance R35. The third amplifier A33 has a first input terminal, a second input terminal and an output terminal. The first input terminal of the third amplifier A33 is electrically connected to an output terminal of the output switching switch S31 via the third resistance R33. In addition, the first input terminal of the third amplifier A33 is electrically connected to a power source for generating an external reference voltage via a fourth resistance R34. A fifth resistance R35 is electrically connected between the output terminal and the second input terminal of the third amplifier A33 for performing feedback of output of the third amplifier A33 to the input side. The output terminal of the third amplifier A33 is electrically connected to the external output terminal 36.

When laser light for DVD (650 nm wavelength) is inputted, the laser light is inputted in the light receiving portion 22 and therefore, an output signal of the first trans-impedance type amplifier 40 configured by the first amplifier A31, the first feedback resistance R31 and the first capacity C31 is inputted in the post-amplifier 42 and voltage of the output signal is amplified and outputted from the external output terminal 36. When laser light for CD (780 nm wavelength) is inputted, the laser light is inputted in the light receiving portion 23 and therefore, an output signal of the second trans-impedance type amplifier 41 configured by the second amplifier A32, the second feedback resistance R32 and the second capacity C32 is inputted in the post-amplifier 42 and voltage of the output signal is amplified and outputted from the external output terminal 36. Here, since the light receiving amplification element is provided with two trans-impedance type amplifiers 40 and 41 for two wavelengths (i.e., light receiving portions), the values of electrical resistance R and capacitance C of the first feedback circuit 38 and the second feedback circuit 39 are adjusted and the feedback constant can be set for each of the pre-amplifiers 40 and 41 corresponding to each of wavelength. Thereby the circuit characteristics can be adjusted so as to be optimized for each wavelength according to difference of optical intensity or the like caused by the wavelength of the laser light.

That is to say, the prior art adapts one light receiving portion and one pre-amplifier to two wavelengths and therefore when the light receiving amplification element is designed (i.e., the feedback constant of the pre-amplifier is set) so as to be adaptable to one of the wavelengths, characteristics for the other wavelength are inevitably determined. In general, there is difference in characteristics of sensitivity of the light receiving portion between 650 nm and 780 nm wavelengths and therefore, when the feedback constant (gain) of the pre-amplifier is adapted to one wavelength, sensitivity of the other wavelength is inevitably determined by the difference in characteristics of sensitivity of the light receiving portion. In addition, since there is difference in the basic frequency between 4.5 MHz for DVD (650 nm) and 0.72 MHz for CD (780 nm), characteristics of response frequency should be adapted to the frequency on the side of DVD.

In this case, there is possibility of deterioration of noise characteristics caused by expansion of a frequency band so as to be adapted to the side of DVD and there is also possibility of degradation of the characteristics in a frequency band in which low frequency CD is used.

However, according to an embodiment of the invention, since two pre-amplifiers 40 and 41 are provided for the side of DVD and the side of CD respectively, the feedback constants (R, C) of the pre-amplifiers can be separately set for each wavelength as an optimum value concerning characteristics of sensitivity and response frequency.

In FIG. 2, an interval distance Y between the light receiving portions 22 for 650 nm wavelength and 23 for 780 nm wavelength is located so that the interval distance Y is substantially equal to an interval distance X between the emitting points 16a for 650 nm wavelength and 16b for 780 nm wavelength of the two-wavelength laser 16 in FIG. 1.

The optical disk 12 is irradiated with laser light output from the two-wavelength laser 16 via one condensing lens 14 irrespective of the wavelength of the laser light and the laser light reflected by the optical disk 12 is inputted in the light receiving amplification element 17 and therefore, different positions of the light receiving amplification element 17 are irradiated with the laser light according to the interval distance between the light emitting points of the two-wavelength laser 16 for each wavelength. Consequently, when the distance between the light receiving portions corresponding to each wavelength is set so that the distance between the light receiving portions is substantially equal to the distance between the light emitting points of the two-wavelength laser 16, the laser light can be received at the maximum. Therefore, good characteristics of S/N can be obtained. In addition, by forming the light receiving portions for each wavelength on the same substrate, accuracy of a position of the distance between the light receiving portions can be improved.

Figure 4:
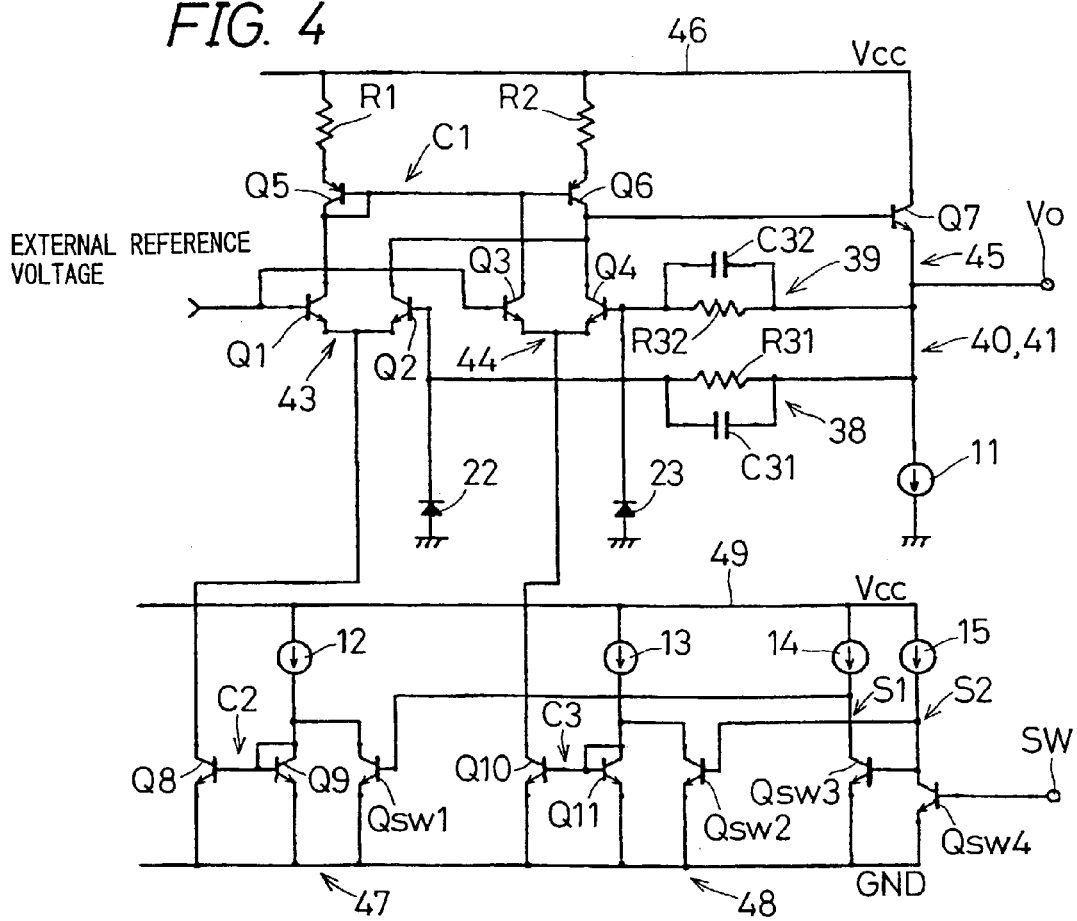
FIG. 4 is an example of the circuit of the light receiving amplification element in the invention.

An example of a circuit for the two trans-impedance type amplifiers 40 and 41 shown in FIG. 3 is shown in FIG. 4.

In FIG. 4, the first trans-impedance type amplifier 40 on the side of DVD (650 nm) comprises a first differential element 43 of transistors Q1 and Q2, and the first feedback circuit 38 including the first feedback resistance R31 and the first capacity C31. The second trans-impedance type amplifier 41 on the side of CD (780 nm) comprises a second differential element 44 of transistors Q3 and Q4, and the second feedback circuit 39 including the second feedback resistance R32 and the second capacity C32. In addition, the circuit in FIG. 4 is provided with a current mirror circuit C1 comprising transistors Q5 and Q6 and resistances R1 and R2 as common active load for differential elements 43 and 44 on the sides of DVD and CD respectively. A collector of the transistor Q6 which is common output for the two differential elements 43, 44 performs signal output to an output terminal Vo via an output buffer circuit 45 (i.e. emitter follower output circuit) comprising a transistor Q7 and a constant current source I1.

According to more detailed description, with regard to the first trans-impedance type amplifier 40, in the first differential element 43, an emitter of the transistor Q1 and an emitter of the transistor Q2 are electrically connected to each other. A base of the transistor Q1 is electrically connected to the power source for generating the external reference voltage. A collector of the transistor Q1 is electrically connected to a collector of the transistor Q5 which configures the current mirror circuit C1. A base of the transistor Q2 is electrically connected to output of the light receiving portion 22. A collector of the transistor Q2 is electrically connected to the collector of the transistor Q6 which configures the current mirror circuit C1.

In the current mirror circuit C1, a base of the transistor Q5 and a base of the transistor Q6 are electrically connected to each other. The collector of the transistor Q5 is short-circuited to a base of the transistor Q5. An Emitter of the transistor Q5 is electrically connected to a bus 46 supplying electric potential Vcc via the resistance R1. An emitter of the transistor Q6 is electrically connected to the bus 46 via the resistance R2.

With regard to the second trans-impedance type amplifier 41, in the second differential element 44, an emitter of the transistor Q3 and an emitter of the transistor Q4 are electrically connected to each other. A base of the transistor Q3 is electrically connected to the power source for generating the external reference voltage. A collector of the transistor Q3 is electrically connected to a base connecting point of the current mirror circuit C1. A collector of the transistor Q4 is electrically connected to the collector of the transistor Q6 which configures the current mirror circuit C1.

The output buffer circuit 45 (i.e. emitter follower output circuit) comprising the transistor Q7 and a constant current source I1 is electrically connected to the bus 46. A base of the transistor Q7 is electrically connected to the collector of the transistor Q6 which configures the current mirror circuit C1. An output terminal Vo is arranged on a collector of the transistor Q7.

The first feedback circuit 38 to which the first feedback resistance R31 and the first capacity C31 are electrically connected in parallel is electrically connected between the base of the transistor Q2 and the collector of the transistor Q7. The second feedback circuit 39 to which the second feedback resistance R32 and the second capacity C32 are electrically connected in parallel is electrically connected between the base of the transistor Q4 and the collector of the transistor Q7.

As mentioned above, since output of the two trans-impedance type amplifiers 40 and 41 becomes common for two wavelengths, one output terminal is sufficient for two input signals (i.e. pre-amplifier) and one post-amplifier 42 for performing amplification of signal voltage is also sufficient for the two input signals. Consequently, output adaptable to two wavelength laser light can be obtained in the light receiving amplification element without increase of any output terminal, and the same number (i.e. one) of post-amplifier is sufficient as used in the prior art and therefore, enlargement of a chip size can be restrained.

In addition, as a switching portion which is switching means, emitter connecting points of the first and second differential elements 43 and 44 are biased by the first and second current sources 47 and 48 comprising the constant current sources I2 and I3, the switching circuits S1 and S2 and the current mirror circuits C2 and C3, and the first and second current sources 47 and 48 are switched by an external switching signal, and the first and second differential elements 43 and 44 are switched in an active state.

In other words, in FIG. 4, as to bias of the differential elements 43 and 44 which configures the trans-impedance type amplifiers 40 and 41, the bias on the side of DVD for 650 nm wavelength (Q1 and Q2, i.e., the differential element 43) comprises transistors Q8, Q9 and Qsw1, the constant current source I2. The bias on the side of CD for 780 nm wavelength (Q3 and Q4, i.e., the differential element 44) comprises transistors Q10, Q11 and Qsw2 and the constant current source I3. Switching circuits S1 and S2 comprising transistors Qsw3 and Qsw4 and constant current sources I4 and I5 are provided.

According to more detailed description, the first current source 47 comprises the current mirror circuits C2, the transistor Qsw1, the constant current source I2 and the first switching circuit S1. The second current source 48 comprises the current mirror circuits C3, the transistor Qsw2, the constant current source I3 and the second switching circuit S2.

The current mirror circuit C2 comprises the transistors Q8 and Q9. A base of the transistor Q8 and a base of the transistor Q9 are electrically connected to each other. A collector of the transistor Q8 is electrically connected to the emitter connecting point of the first differential elements 43. A collector of the transistor Q9 is short-circuited to a base of the transistor Q9 and is electrically connected to a bus 49 supplying electric potential Vcc via the constant current source I2. Emitters of the transistor Q8 and Q9 are grounded on a grounding wire GND.

The current mirror circuit C3 comprises the transistors Q10 and Q11. A base of the transistor Q10 and a base of the transistor Q11 are electrically connected to each other. A collector of the transistor Q10 is electrically connected to the emitter connecting point of the second differential elements 44. A collector of the transistor Q11 is short-circuited to a base of the transistor Q11 and is electrically connected to a bus 49 via the constant current source I3. Emitters of the transistor Q10 and Q11 are grounded on the grounding wire GND.

The first switching circuit S1 and the second switching circuit S2 are connected in parallel between the bus 49 and the grounding wire GND. The first switching circuit S1 comprises the constant current source I4 and the transistor Qsw3. The second switching circuit S2 comprises the constant current source I5 and the transistor Qsw4. A base of the transistor Qsw3 is electrically connected to a collector of the transistor Qsw4. A collector of the transistor Qsw3 is electrically connected to the bus 49 via the constant current source I4. A collector of the transistor Qsw4 is electrically connected to the bus 49 via the constant current source I5. A base of the transistor Qsw4 is electrically connected to a SW terminal in which an external switching signal is inputted. Emitters of transistors Qsw3 and Qsw4 are grounded on the grounding wire GND.

A base of the transistor Qsw1 is electrically connected to a connecting point of a collector of the transistor Qsw3 in the first switching circuit S1 and the constant current source I4. A collector of the transistor Qsw1 is electrically connected to a collector of the transistor Q9 in the current mirror circuit C2. An emitter of the transistor Qsw1 is grounded on the grounding wire GND.

A base of the transistor Qsw2 is electrically connected to a connecting point of a collector of the transistor Qsw4 in the second switching circuit S2 and the constant current source I5. A collector of the transistor Qsw2 is electrically connected to a collector of the transistor Q11 in the current mirror circuit C3. An emitter of the transistor Qsw2 is grounded on the grounding wire GND.

According to description on the side of DVD (650 nm wavelength), when the transistor Qsw1 is in an OFF state (i.e. the SW terminal is Low), current supplied from the constant current source I2 is given to the differential element 43 comprising the transistors Q1 and Q2 via the current mirror circuit C2 comprising transistors Q8 and Q9. Therefore, the differential element 43 becomes an active state. At the time of this active state, the state on the side of CD (780 nm wavelength) is non-active state. When the SW terminal is switched from Low to High, the transistor Qsw4 becomes an ON state therefore, electric potential of the collector of the transistor Qsw4 drops down to a level close to GND and the transistor Qsw3 becomes an OFF state. When the transistor Qsw3 is in an OFF state, electric potential of the collector of the transistor Qsw3 rises up to a level close to Vcc and therefore, the transistor Qsw1 becomes an ON state and all the current from the constant current source I2 flows to GND via the transistor Qsw1 and no bias current flows in the differential element 43 comprising the transistors Q1 and Q2 and the differential element 43 becomes non-active state. At the time of this non-active state, the state on the side of CD (780 nm wavelength) is contrarily an active state.

As mentioned above, switching the two trans-impedance type amplifiers 40 and 41 can be realized with a little number of elements and increase of cost caused by enlargement of chip size can be restrained by switching bias current of the differential elements 43 and 44.

(Embodiment 2)

Figure 5:
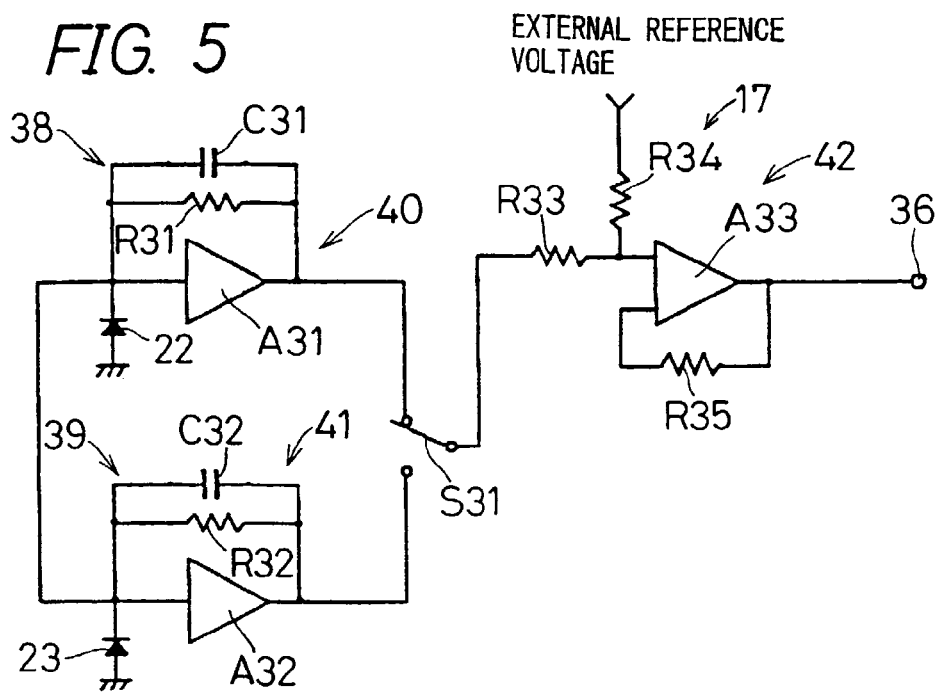
FIG. 5 is an equivalent circuit block diagram of the light receiving amplification element according to an embodiment 2 of the invention.

FIG. 5 is another equivalent circuit block diagram of the light receiving amplification element for outputting light signals sent from the two main light receiving portions corresponding to the two wavelengths in FIG. 2 as electric signals.

Here, the different points from FIG. 3 are as follows:

Output points of signals of the two light receiving portions 22 and 23 are connected to each other and output of signals of the two light receiving portions 22 and 23 are inputted to each of the two trans-impedance type amplifiers 40 and 41.

In addition, the values of the feedback resistances R31 and R32 are different in the two trans-impedance type amplifiers 40 and 41, and the value of the resistance R31 is set so as to be optimum sensitivity (i.e. gain) for a reproduction only optical disk having high reflectance, and the value of the resistance R32 is set so as to be optimum sensitivity (i.e. gain) for a rewritable optical disk having low reflectance. In an embodiment of the invention, the values of the resistances comply with the following inequality: R31<R32.

Since signal light for the light receiving amplification element 17 is the light reflected from an optical disk, quantity of signal light inputted in the light receiving amplification element 17 varies due to different reflectance of the optical disk. In general, it is known that reflectance of a reproduction only (ROM) optical disk is high and reflectance of a rewritable (RW) optical disk is low approximately one fourth of that of the ROM optical disk.

As mentioned above, by connecting output of the two light receiving portions 22 and 23, inputting light the output in each of the trans-impedance type amplifiers 40 and 41, and separately setting the value of the feedback resistance of each of the pre-amplifiers 40 and 41 as optimum sensitivity (i.e. gain) for the reproduction only optical disk and optimum sensitivity (i.e. gain) for the rewritable optical disk, effect on both optical disks for DVD (650 nm) and CD (780 nm) caused by variation of reflectance of the optical disks can be restrained and stable characteristics of the light receiving amplification element can be obtained.

(Embodiment 3)

Figure 6:
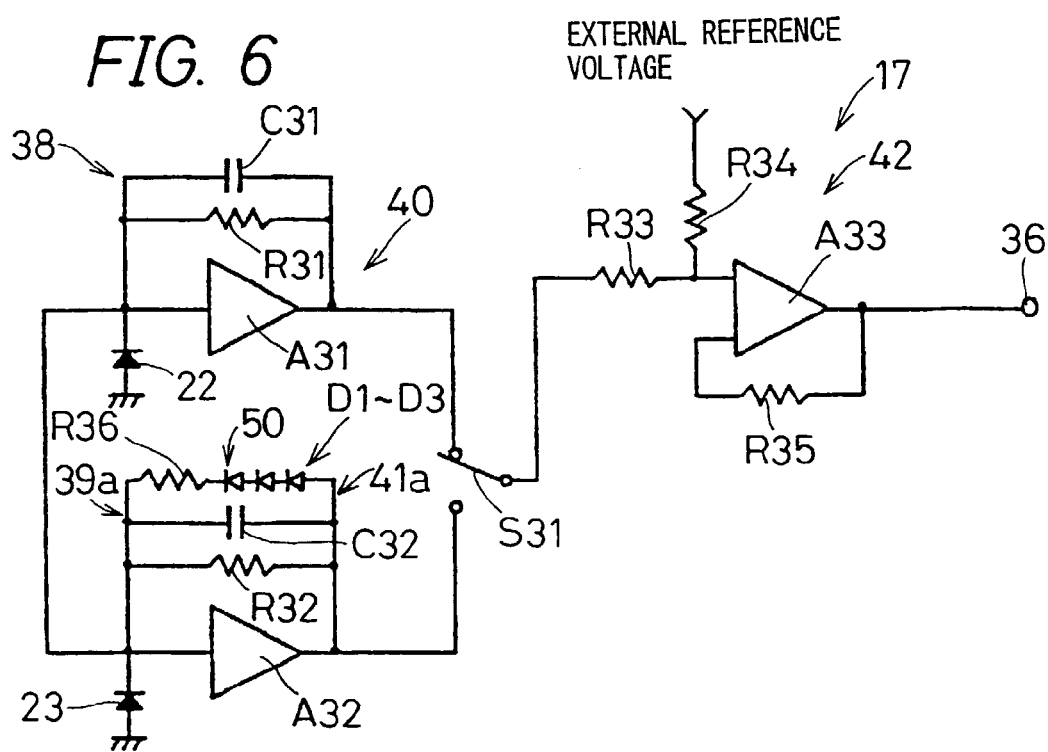
FIG. 6 is an equivalent circuit block diagram of the light receiving amplification element according to an embodiment 3 of the invention.
Figure 7:
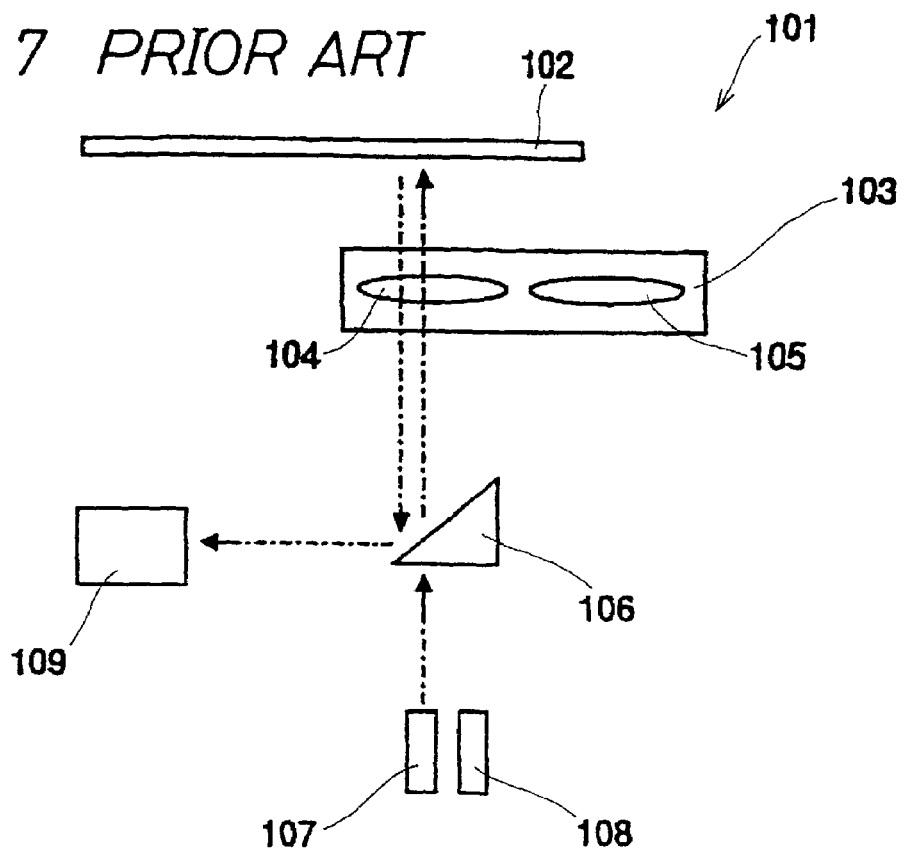
FIG. 7 is a side view of an optical pickup apparatus using a light receiving amplification element in the prior art.
Figure 8:
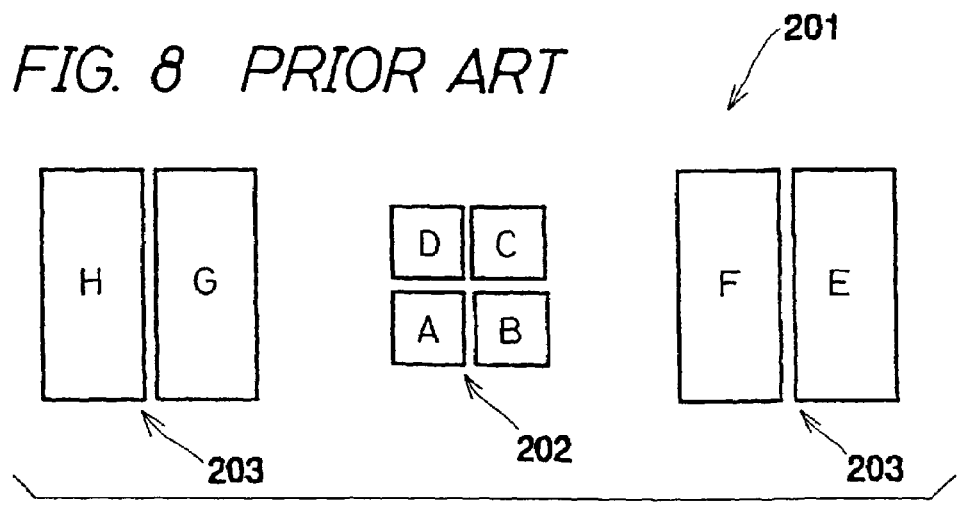
FIG. 8 is a view showing a shape of a light receiving portion of the light receiving amplification element in the prior art.
Figure 9:
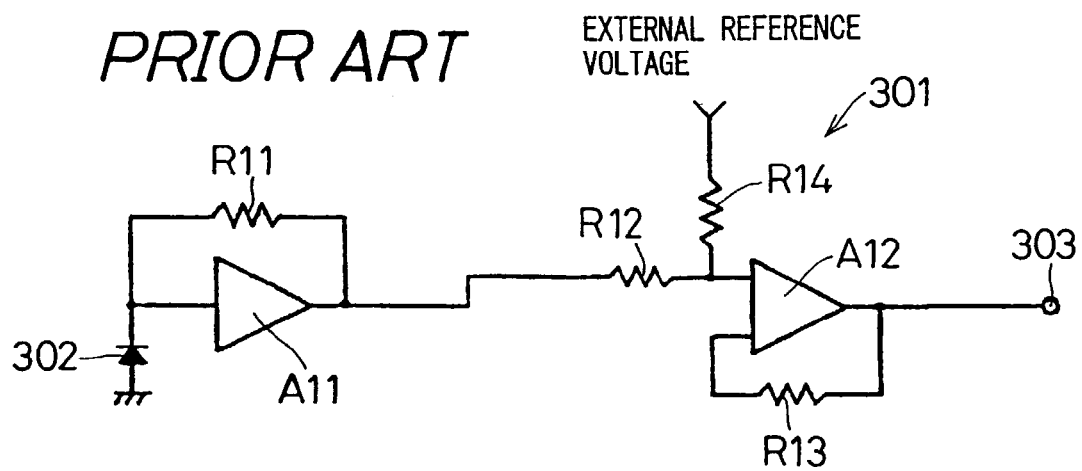
FIG. 9 is an equivalent circuit block diagram of the light receiving amplification element in the prior art.

FIG. 6 is still another equivalent circuit block diagram of the light receiving amplification element for outputting light signals sent from the two main light receiving portions corresponding to the two wavelengths in FIG. 2 as electric signals.

Here, the different points from FIG. 5 are as follows:

In the feedback circuit 39 of the second trans-impedance type amplifiers 41a, a clamp circuit 50 comprising a resistance R36 and diodes D1 through D3 is connected in parallel with the second feedback resistance R32 and the second capacity C32, and the second feedback resistance R32 is set as sufficiently smaller value than the first resistance R31 so that the second feedback resistance R32 is adaptable to large quantity of light at the time of writing operation (R31>>R32).

The first trans-impedance type amplifiers 40 comprising the first amplifier A31, the first feedback resistance R31 and the first capacity C31 is set to be used for reproduction and the second trans-impedance type amplifiers 41a comprising the second amplifier A32, the second feedback resistance R32, the second capacity C32 and the clamp circuit 50 preventing saturation at the time of inputting large quantity of light is set to be used for writing operation. Thereby the light receiving amplification element provided with function of recording/reproducing for two wavelengths for DVD (650 nm) and CD (780 nm) can be realized.

As mentioned above, according to the light receiving amplification element described as the embodiments 1 through 3, the light receiving amplification element can be provided so as to be applicable to the optical pickup apparatus comprising the two-wavelength laser outputting laser light having two different wavelengths from one chip and one optical lens which irradiates the optical disk with laser light from the two-wavelength laser irrespective of a wavelength and guides the reflecting light to the light receiving amplification element.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A light receiving amplification element which is used for an optical pickup apparatus including a semiconductor laser having a plurality of light emitting points from which different wavelength light is emitted each other, and an optical element for irradiating an optical disk with emitting light from the semiconductor laser and guiding reflecting light on the optical disk to the light receiving amplification element, the light receiving amplification element comprising:

a plurality of light receiving portions corresponding to the different wavelengths;

a plurality of trans-impedance type amplifiers connected to the light receiving portions according to the different wavelengths and corresponding to the different wavelengths; and switching means for switching outputs from the trans-impedance type amplifiers according to each of the wavelengths.

2. The light receiving amplification element of claim 1, wherein the plurality of trans-impedance type amplifiers comprise a first trans-impedance type amplifier having a feedback constant adapted to a first wavelength and a second trans-impedance type amplifier having a feedback constant adapted to a second wavelength.

3. The light receiving amplification element of claim 2, wherein the first and second trans-impedance type amplifiers comprise:

first and second differential elements;

a single current mirror circuit in which output of the differential elements is electrically connected to each other and which acts as an active load;

an emitter follower output circuit; and two feedback circuits, an output terminal is provided with respect to the first and second trans-impedance type amplifiers.

4. The light receiving amplification element of claim 3, wherein the switching means operates to bias emitter connecting points of the first and second differential elements in first and second current sources comprising a constant current source, a switching circuit and a current mirror circuit; to switch the first and second current sources by an external switching signal; and to switch the first and second differential elements in an active state.

5. The light receiving amplification element of claim 1, wherein the plurality of light receiving portions and the plurality of trans-impedance type amplifiers are formed on a single chip and a distance between the plurality of light receiving portions is equal to a distance between the plurality of emitting points.

6. A light receiving amplification element which is used for an optical pickup apparatus including a semiconductor laser having a plurality of light emitting points from which different wavelength light is emitted each other and an optical element for irradiating an optical disk with emitting light from the semiconductor laser and guiding reflecting light on the optical disk to the light receiving amplification element, the light receiving amplification element comprising:

a plurality of light receiving portions corresponding to the different wavelengths;

a plurality of trans-impedance type amplifiers connected to the plurality of light receiving portions and corresponding to a plurality of optical disks with different reflectance; and switching means for switching outputs from the trans-impedance type amplifiers according to the optical disk, the light receiving amplification element being commonly connected between outputs from the plurality of light receiving portions and inputs to the plurality of trans-impedance type amplifier.

7. The light receiving amplification element of claim 6, wherein the plurality of trans-impedance type amplifiers comprise a first trans-impedance type amplifier having a first feedback constant adapted to reflectance of a reproduction only optical disk and a second trans-impedance type amplifier having a second feedback constant adapted to reflectance of a rewritable optical disk.

8. The light receiving amplification element of claim 7, wherein a clamp circuit comprising a diode and a resistance is connected in parallel to a second feedback circuit which sets the second feedback constant.

9. The light receiving amplification element of claim 8, wherein the first and second trans-impedance type amplifiers comprise:
   first and second differential elements;
   a single current mirror circuit in which output of the differential elements is electrically connected to each other and which acts as an active load;
   an emitter follower output circuit; and
   two feedback circuits,
   an output terminal is provided with respect to the first and second trans-impedance type amplifiers.

10. The light receiving amplification element of claim 9, wherein the switching means operates to bias emitter connecting points of the first and second differential elements in first and second current sources comprising a constant current source, a switching circuit and a current mirror circuit; to switch the first and second current sources by an external switching signal; and to switch the first and second differential elements in an active state.

11. The light receiving amplification element of claim 7, wherein the first and second trans-impedance type amplifiers comprise:
   first and second differential elements;
   a single current mirror circuit in which output of the differential elements is electrically connected to each other and which acts as an active load;
   an emitter follower output circuit; and
   two feedback circuits,
   an output terminal is provided with respect to the first and second trans-impedance type amplifiers.

12. The light receiving amplification element of claim 11, wherein the switching means operates to bias emitter connecting points of the first and second differential elements in first and second current sources comprising a constant current source, a switching circuit and a current mirror circuit; to switch the first and second current sources by an external switching-signal; and to switch the first and second differential elements in an active state.

13. The light receiving amplification element of claim 6, wherein the plurality of light receiving portions and the plurality of trans-impedance type amplifiers are formed on a single chip and a distance between the plurality of light receiving portions is equal to a distance between the plurality of emitting points.

14. An optical pickup apparatus comprising:
   a semiconductor laser having a plurality of light emitting points from which different wavelength light is emitted each other;
   a light receiving amplification element including:
      a plurality of light receiving portions corresponding to the different wavelengths;
      a plurality of trans-impedance type amplifiers connected to the light receiving portions according to the different wavelengths and corresponding to the different wavelengths; and
      switching means for switching an output from the trans-impedance type amplifier according to each of the wavelengths; and
   an optical element for irradiating an optical disk with emitting light from the semiconductor laser and guiding reflecting light on the optical disk to the light receiving amplification element.

15. An optical pickup apparatus comprising:
   a semiconductor laser having a plurality of light emitting points from which different wavelength light is emitted each other;
   a light receiving amplification element including:
      a plurality of light receiving portions corresponding to the different wavelengths;
      a plurality of trans-impedance type amplifiers connected to the plurality of light receiving portions and corresponding to a plurality of optical disks with different reflectance; and
      switching means for switching an output from the trans-impedance type amplifier according to the optical disk,
      the light receiving amplification element being commonly connected between outputs from the plurality of light receiving portions and inputs to the plurality of trans-impedance type amplifier; and
   an optical element for irradiating an optical disk with emitting light from the semiconductor laser and guiding reflecting light on the optical disk to the light receiving amplification element.

* * * * *